Patented Nov. 30, 1943

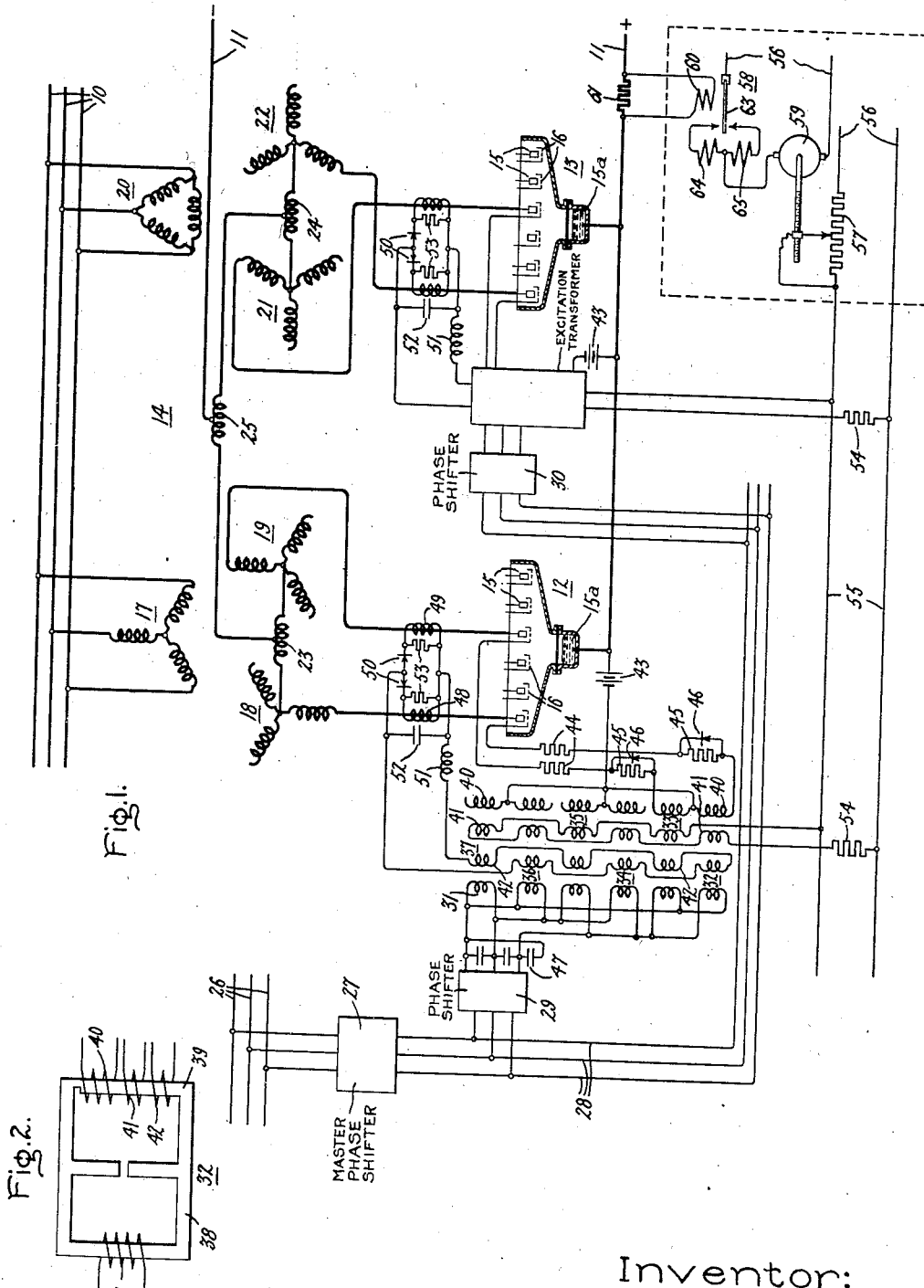
Inventor:
Carl C. Herskind,
by Harry E. Dunham
His Attorney.

2,335,673

UNITED STATES PATENT OFFICE 2,335,673

ELECTRIC VALVE TRANSLATING APPARATUS

Carl C. Herskind, Schenectady, N. Y., assignor to General Electric Company, a corporation of New York Application December 24, 1940, Serial No. 371,559

5 Claims. (Cl. 175—363)

My invention relates to electric valve translating apparatus, and more particularly to improved control circuits for translating apparatus of this character.

In electric valve translating systems including a plurality of electric discharge paths in parallel, there is a tendency for certain of the discharge paths to conduct more than their proportionate share of the load current. This tendency is apt to be cumulative and to result in poor utilization of the equipment, poor wave shape in alternating current circuits and poor overall operation of the system. Arrangements have been provided for maintaining load division between parallel operating discharge paths substantially in accordance with the rating of the discharge paths by controlling the excitation of the control electrodes associated therewith. An arrangement of this type employing saturable inductive devices interconnected by an equalizing bus is described and claimed in my Patent 2,246,178, dated June 17, 1941, and assigned to the assignee of the present invention. In accordance with the teachings of my invention I provide an improved control circuit for maintaining load division between a plurality of parallel operating discharge paths and also an improved arrangement for maintaining a desired electrical condition of the output circuit regardless of the amount of control used to maintain the load division.

It is an object of my invention to provide a new and improved electric valve translating system.

It is another object of my invention to provide a new and improved control circuit for maintaining load division between a plurality of parallel operating electric discharge paths.

It is still another object of my invention to provide an improved control circuit for maintaining division of load between a plurality of parallel discharge paths which does not become increasingly complicated as the number of discharge paths to be controlled increases.

It is a further object of my invention to provide a new and improved control circuit for electric valve translating apparatus which maintains a desired division of load between parallel operating discharge paths and also a desired electrical condition of the load circuit energized by the valve translating apparatus which is characterized by its simplicity and effective operation.

In accordance with an illustrated embodiment of my invention a twelve-phase electric valve translating system interconnects an alternating current circuit and a direct current circuit and includes two six-phase rectifier units operating in parallel. Each of the discharge paths of the rectifier tanks, or units, is provided with a control electrode which is energized by means of suitable excitation or peaking transformers with periodic potentials of peaked wave form having the periodicity of the alternating current circuit. The peaking, or impulse transformers are provided with direct current control windings. One of the control windings is energized in accordance with the current transmitted by the particular rectifier unit with which it is associated through means including current transformers and a plurality of unilaterally conducting devices. The control windings thus energized are effective to retard automatically the phase of the peaked potentials impressed on the control members as the current transmitted by the discharge paths increases. In order to maintain a desired output current of the parallel operating rectifier units a second control winding is provided on the peaking transformers and energized from a direct current circuit having a potential dependent upon the magnitude of the load current. These coils are arranged in such a manner that an increase in the direct current therethrough tends to advance the phase of the control potentials. In this manner an output characteristic such as the output current of the rectifier system may be made to remain substantially constant and independent of the amount of retard in phase produced by the first control windings in response to the current conducted by the individual units. With this system the effective regulation curve of each unit is steeper than the inherent voltage regulation curve so that tendency for one rectifier unit to take more than its share of the load is reduced to a minimum and at the same time the regulating system is effective to compensate for this control utilized for load division so that a desired characteristic of voltage or current of the load circuit may be maintained. This provides for the proper paralleling of the rectifier without sacrifice in overall characteristics of power output and power factor on the alternating current side.

My invention will be better understood by reference to the following description taken in connection with the accompanying drawing and its scope will be pointed out in the appended claims. In the drawing, Fig. 1 is a schematic representation of one embodiment of my invention, and Fig. 2 is a schematic representation of one of the excitation transformers utilized in the modification illustrated in Fig. 1.

Referring now to Fig. 1 of the drawing, my invention is there illustrated as embodied in an electric valve translating apparatus interconnecting an alternating current supply circuit 10 and a direct current load circuit 11. The electric translating apparatus includes a pair of converter units or tanks 12 and 13, and a twelve-phase transformer arrangement illustrated generally by the numeral 14. The rectifier units 12 and 13 are preferably of the type employing an ionizable medium such as a gas or vapor, and each comprises a plurality of anodes 15, a cathode of conducting liquid 15a, and a plurality of control members or grids 16, each associated with one of the anodes. While converting units comprising a plurality of anodes and associated control members with a single cathode have been illustrated, it will be apparent to those skilled in the art that any other type of discharge valves well known in the art may be employed. The transformer 14 includes a Y-connected primary winding 17, associated Y-connected secondary windings 18 and 19, and a delta-connected primary winding 20 and associated Y-connected secondary windings 21 and 22. The end terminals of the secondary windings 18 and 19 are connected with the anodes 15 of converting unit 12, while the end terminals of the windings 21 and 22 are connected with the anodes of the converting unit 13. The neutrals of the Y-connected windings 18 and 19 are interconnected by a phase equalizing inductive winding or interphase transformer 23 and the Y-connected windings 21 and 22 are connected by an interphase transformer 24. The midpoints of interphase transformers 23 and 24 are connected to the end terminals of an interphase transformer 25, the midpoint of which is connected to the negative line of the direct current circuit 11. The cathodes 15a of converting units 12 and 13 are connected together and to the positive line of the direct current circuit 11. As is well understood by those skilled in the art, the network just described, including the transformer secondary windings and the interphase transformer windings, is effective to provide twelve-phase operation of the converting units 12 and 13.

The discharge paths of the converting units 12 and 13 are rendered conductive periodically by means of a control circuit which impresses periodic potentials of peaked wave form thereon. Since the control circuits for units 12 and 13 are substantially identical, only one has been illustrated in detail. The control circuit includes a supply of alternating control voltage 26 having the frequency of the supply circuit 10 which is preferably derived from the alternating current supply circuit through insulating transformers (not shown). A master phase shifter 27 energized from the supply of control potential 26 energizes a control bus 28 from which auxiliary phase shifters 29 and 30 and the excitation circuits associated with units 12 and 13 are energized. The three-phase output of phase shifter 29 is impressed on the delta-connected primary windings 31 of excitation transformers 32 to 37 inclusive. The construction of one of the six excitation transformers is shown in more detail in Fig. 2. Referring now to Fig. 2, each of the transformers includes a core structure 38 having a saturable leg 39 on which is wound a secondary winding 40 and a pair of direct current control windings 41 and 42. Referring again to Fig. 1, the excitation transformers are arranged in three groups with the two primaries of each group being energized from the same one of the phases of the output of phase shifter 29. One terminal of each secondary winding 40 of the transformers 32 to 37 inclusive is connected to one terminal of a biasing battery 43, the other terminal of which is connected to the cathode of the converting unit 12. The end terminal of each of the transformer secondary windings is connected with one of the control members of the unit 12 through a circuit including a current limiting resistor 44 and an additional resistor 45 which is shunted by a unilaterally conductive device 46 poled in a direction to conduct positive grid current. As illustrated in the drawing, the end terminals of the transformer secondary windings of transformers 32 and 33 are connected with control members associated with anodes arranged to conduct at intervals displaced by 180 electrical degrees. Capacitors 47 are connected across the primary windings 31 of the transformers 32 to 37 to compensate for the lagging power factor current drawn by the excitation transformers and reduce the volt-ampere rating required in the phase shifters 27, 29 and 30.

The control windings 42 of excitation transformers 32 to 37 are connected in series and energized from a source of direct current potential which varies in magnitude with the magnitude of the current conducted by the converting unit 12. The polarity of the direct current potential energizing these windings is such as to retard the phase of the excitation potentials induced in the secondary windings 40 as the current conducted by the unit 12 increases. The effect of this control may be considered as increasing the slope of the regulation curve of the individual converter unit and in this way minimizes the tendency of the unit to take more than its share of the load when operated in parallel with another unit such as unit 13.

In the particular embodiment illustrated, the means for obtaining a direct current potential which varies in accordance with the current conducted by the unit 12, comprises current transformers 48 and 49 associated with the anode leads of the valve converting unit 12 which conduct current at intervals displaced by 180 electrical degrees. The output of the current transformers 48 and 49 is supplied to the series connected control windings 42 through unilateral conducting devices 50 and a filter circuit including a reactor 51 and capacitor 52. This filter serves to smooth out the pulsating direct current output of the current transformers and unilateral conducting devices 50. Resistors 53 are connected across the current transformers to provide a path for the magnetizing current of the transformers during the half cycles that the anodes with which they are associated are nonconductive. It will be understood that an excitation circuit similar to that just described in connection with converting unit 12 is provided for converting unit 13 so that the excitation potentials applied to the control members of unit 13 are also retarded in phase automatically as the current conducted thereby increases. Although in the illustrated embodiment applicant's invention is shown as applied to two separate converting units, it may be readily utilized to balance the current conducted by any number of parallel operating discharge paths, such for example, as the discharge paths associated with the two Y-connected windings connected with each of the converting units 12 and 13.

The arrangement just described for forcing division of load between converting units 12 and 13 by retarding the phase of the excitation potentials applied to the control members of each unit as the current conducted thereby increases tends to give the converting apparatus very poor regulation and accordingly I provide means for automatically varying the phase of the excitation potentials applied to the control members of all of the discharge paths of the converting units 12 and 13 in accordance with an electrical condition of the load circuit 11. The control windings 41 of excitation transformers 32 to 37 are all connected in series through a current limiting resistor 54 to a bus 55 which provides a source of direct current potential variable in response to an electrical condition of the output circuit 11. In the arrangement shown, the bus 55 is energized from a direct current source 56 through a variable resistor 57 which is controlled in accordance with the current of the direct current circuit 11 by a current regulating relay means 58 and a reversible direct current motor 59. The actuating coil 60 of the current regulating relay 58 is energized by the potential across a resistor 61 connected in series with the direct current load circuit. The movable contact 63 of the relay 58 engages fixed contacts associated with different field winding sections 64 and 65 of the direct current motor 59 to energize the motor for operation in opposite directions from a source of direct current voltage which may be the source 56.

In the operation of the system just described, the discharge paths of the converting units 12 and 13 operate in parallel and with the transformer arrangement illustrated operate as a twelve-phase rectifier system for transmitting energy from the alternating current circuit 10 to the direct current circuit 11. The discharge paths are normally rendered nonconductive by the control members 16 energized by the negative biasing battery 43 and are sequentially rendered conductive by periodic potentials of peaked wave form impressed thereon by the secondary windings 40 of the excitation transformers. As is well understood by those skilled in the art, the output voltage or the output current of the rectifier system may be controlled by controlling the time in the anode-cathode voltage wave of each of the discharge paths that the discharge path is rendered conductive. In accordance with the present invention the moment of initiation of discharge of each of the discharge paths is retarded as the current conducted by the discharge path increases. This arrangement serves to minimize the tendency of any of the parallel paths to carry more than their share of the load. With this control alone, the voltage regulation of the direct current circuit is very poor and in order to maintain a desired output voltage or in the embodiment illustrated a desired output current, the control windings 41 are energized by a variable direct current voltage under the control of a regulating relay means 58. When the current in the direct current circuit 11 is above that desired the movable element 63 of relay 58 is operated to complete a circuit through field winding section 64 of motor 59 to operate the same in a direction to increase the portion of the variable resistance 57 included in circuit with the direct current source 56. This reduces the current through the control windings 41 and results in retarding the phase of the potentials impressed on the control members of all of the discharge paths. When the current in the direct current circuit falls below a predetermined value the movable element 63 of relay 58 operates to energize the other field winding section 15 and causes the direct current motor to rotate in the opposite direction and decrease the resistance in circuit with the control windings 41. This results in an advance in phase of the potentials impressed upon the control members of all of the discharge paths and restores the desired load current in the direct current circuit.

From the foregoing description it is apparent that the present invention provides means for maintaining load division as well as a predetermined characteristic of the output circuit which is simple and which offers definite advantages over those arrangements for maintaining a division of load requiring means for comparing the currents conducted by the parallel paths with each other to obtain a resultant voltage or magnetomotive force by a comparison network which becomes more and more complicated as the number of parallel paths to be controlled increases.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, electric translating apparatus interconnecting said circuits and including a pair of parallel electric discharge paths, a control electrode for controlling the initiation of discharge in each of said parallel discharge paths, a control circuit for controlling the energization of said control electrodes including saturable transformer means associated with each of said control electrodes for impressing periodic potentials of peaked wave form thereon, each of said transformer means including a primary winding, a secondary winding associated with a control electrode and a pair of direct current control windings, means for energizing said primary winding with a periodic voltage, means for energizing one of the control windings of each of said transformer means in response to the current conducted by the discharge path controlled by the control electrode with which the transformer means is associated, means for energizing the other control winding of all said transformer means in accordance with an electrical condition of one of the circuits interconnected by said electric translating apparatus, the unidirectional magnetomotive forces produced by said control windings being opposed so that the phase of the periodic potentials impressed on said control members is shifted in accordance with the relative magnitudes of the magnetomotive forces produced by said control windings.

2. In combination, an alternating current circuit, a direct current circuit, electric translating apparatus interconnecting said circuits and including two groups of electric discharge paths, a control electrode associated with each of said discharge paths for controlling the initiation of discharge therein, a control circuit for controlling the energization of said control electrodes including a saturable transformer means associated with each group of discharge paths and having a primary winding, a secondary winding associated with one of said control electrodes and a pair of control windings for impressing on each of said transformer means unidirectional magnetomotive forces, means for energizing said primary winding with periodic voltage, means for energizing one of the control windings of each of said transformer means in accordance with the current conducted by one of said groups of electric discharge paths, and means for energizing the other control winding of each of said transformer means in accordance with an electrical condition of said direct current circuit.

3. In combination, a supply circuit, a load circuit, electric translating apparatus interconnecting said circuits and including a pair of electric discharge paths connected in parallel, a control electrode for controlling the initiation of discharge in each of said parallel discharge paths, a control circuit for controlling the energization of said control electrodes including transformer means associated with each of said control electrodes for impressing thereon periodic potentials of peaked wave form and each including a primary winding, a secondary winding and a pair of direct current control windings, means for supplying a periodic voltage to said primary winding, means connecting said secondary winding with one of said control electrodes, means responsive to the current transmitted by one of said discharge paths for energizing one of said direct current windings for retarding automatically the phase of the potential applied to the control electrode associated therewith as the current of said one discharge path increases, and means for energizing the other of said direct current windings in accordance with an electrical condition of said load circuit to maintain a predetermined characteristic of said electrical condition.

4. In combination, a supply circuit, a load circuit, at least one of said circuits being an alternating current circuit, a plurality of translating devices interposed in parallel relation between said circuits for transmitting energy therebetween and including at least one electric valve means having an anode, a cathode and a control member, means for effecting a predetermined distribution of load between said translating devices comprising a saturable inductive device including a core member, a first control winding, means for energizing said first control winding in response to the current conducted by said electric valve means to impress a unidirectional magnetmotive force on said core member, a second control winding, means for energizing said second control winding to impress a unidirectional magnetomotive force on said core member in opposition to the magnetomotive force produced by said first control winding and which varies in accordance with an electrical condition of said load circuit, a primary winding, means for energizing said primary winding with a periodic voltage, and a secondary winding responsive to a magnetic condition of said core member for impressing on said control member a periodic voltage variable in phase relative to the voltage impressed across said anode and cathode, the magnetomotive force produced by said first mentioned control winding being in a direction to retard the phase of the voltage impressed on said control electrode.

5. In combination, a supply circuit, a load circuit, at least one of said circuits being an alternating current circuit, a plurality of translating devices interposed in parallel relation between said circuits for transmitting energy therebetween and including at least one electric valve means having an anode, a cathode and a control means, and means for effecting a predetermined distribution of load between said electric valve means and the other of said translating devices comprising a saturable inductive device including a core member, a winding for impressing on said core member an alternating magnetomotive force, a control winding for impressing on said core member a unidirectional magnetomotive force which varies in accordance with the current transmitted by said electric valve means, a second control winding for impressing on said core member a second unidirectional magnetomotive force which opposes said first mentioned magnetomotive force and which varies in accordance with an electrical condition of said load circuit, and a winding responsive to a magnetic condition of said core member for impressing on said control means an alternating current voltage variable in phase relative to the voltage impressed across said anode and cathode.

6. An alternating current circuit, a direct current circuit, electric translating apparatus interconnecting said circuits and including a pair of parallel electric discharge paths, a control electrode associated with each of said discharge paths for controlling the initiation of discharge therein, a control circuit for energizing said control electrodes to maintain a predetermined division of load between said parallel operating discharge paths including saturable transformer means associated with each of said control electrodes and including a primary winding, a secondary winding associated with one of said control electrodes and a direct current control winding, means for energizing said primary winding with a periodic voltage, means for energizing said direct current winding in accordance with the current conducted by the discharge path controlled by the control electrode with which said transformer means is associated to impress a unidirectional magnetomotive force on said transformer means in a direction to retard the phase of the potential impressed on the control electrode energized therefrom as the current conducted by the discharge path controlled thereby increases, and means for controlling the phase of the potentials applied to the control electrodes associated with all of the parallel operating discharge paths in accordance with the combined output of the parallel operating discharge paths.

CARL C. HERSKIND.